United States Patent [19]

Hunter

[11] Patent Number: 4,927,125
[45] Date of Patent: May 22, 1990

[54] SET UP ASSEMBLY

[75] Inventor: Jerry J. Hunter, Madison, Ind.

[73] Assignee: Doe Run Tooling, Inc., Madison, Ind.

[21] Appl. No.: 334,000

[22] Filed: Apr. 4, 1989

[51] Int. Cl.$^5$ .............................................. B23Q 1/04
[52] U.S. Cl. ...................................................... 269/74
[58] Field of Search ................ 33/537, 538, 418, 539, 33/536, 568, 573; 409/224, 219, 168; 274/5, 112; 269/81–85, 71, 74, 88, 79, 900; 16/255, 256, 258; 403/161, 162, 196

[56] References Cited

U.S. PATENT DOCUMENTS

| | | | |
|---|---|---|---|
| 2,351,773 | 6/1944 | Lovenston | 269/79 |
| 2,365,436 | 12/1944 | Saucier | 269/79 |
| 2,369,148 | 2/1945 | Langhorst | 16/258 |
| 2,449,459 | 3/1948 | Eckert . | |
| 2,778,053 | 1/1957 | Hess et al. | 16/258 |
| 2,889,757 | 2/1959 | Cole . | |
| 3,075,291 | 11/1963 | Robertson et al. . | |
| 3,094,821 | 4/1963 | Eckert . | |
| 3,432,934 | 3/1969 | Schmidt . | |
| 3,788,633 | 1/1974 | Cho | 269/79 |
| 3,862,498 | 1/1975 | Klucznik . | |
| 4,726,576 | 2/1988 | Siniko | 409/224 |

OTHER PUBLICATIONS

Technology Tips, "Workholding System for Multiple Operations on Multiple Machine Tools", James A. Masar, Apr. 1989.

Primary Examiner—Robert C. Watson
Attorney, Agent, or Firm—Wood, Herron & Evans

[57] ABSTRACT

A versatile set up assembly for holding a workpiece during a machining operation includes upper and lower plates that can be selectively hingedly connected and/or disconnected along spaced parallel axes of connection, thereby permitting either end of the upper plate to be hingedly raised with respect to the lower plate, or the upper plate removed entirely. Two rolls are rotatably mounted to one of the plates along two spaced, parallel axes. The other plate has two pairs of connectors, each pair axially aligned with and adapted to precisely engage the outer ends of one off the rolls along an axis of connection. When the aligned connectors are moved into engagement with the respective ends of a roll, precisely machined surfaces of the connectors and the outer ends coact to ensure the forming of an accurate and repeatable hingable connection between the plates along the axis of connection.

28 Claims, 3 Drawing Sheets

SET UP ASSEMBLY

FIELD OF THE INVENTION

This invention relates to a set up assembly used to secure a workpiece holder to a machine tool table during a machining operation.

BACKGROUND OF THE INVENTION

A set up assembly is commonly used to secure a workpiece holder, such as a vise, to a machine tool table within the range of a machine tool, thereby facilitating a machining operation upon a workpiece mounted on the workpiece holder. For high precision machining of critically dimensioned workpieces, or parts, it is absolutely necessary that the set up assembly provide accurate and repeatable positioning of the workpiece with respect to both the machine tool table and the machine tool. For the purposes of this application, the term "machining" is meant to encompass, for instance, milling, grinding, drilling, boring, etc.

During machining, it is often necessary to hold the workpiece at an angle with respect to the machine tool, so that an accurate angled cut can be made. For this reason, a conventional set up assembly includes a pair of hinged set up plates. A bottom plate is attachable to the machine tool table and a top plate supports the workpiece holder and is hinged to the bottom plate. The top plate, sometimes referred to as a sine plate, is supported at a desired angle by a gauge block.

The top and bottom plates are hingedly connected by a first roll that is fixedly secured to the top plate along the axis of connection. A second roll is mounted to the raisable side of the top sine plate, and is spaced from, and parallel to, the first roll. When the top plate is in an unraised position, the rolls support the top plate in a horizontal plane, with the rolls being spaced a fixed distance apart. When the top plate is hingedly raised about the first roll, the gauge block is situated between the bottom plate and the second roll, supporting the top plate in a raised position. Because the fixed distance between the rolls is known and the height of the gauge block is also known, an angle of inclination between the plates can be readily determined and easily repeated in subsequent operations. With the bottom plate secured to a machine tool table, a workpiece holder secured to the top plate, and a workpiece mounted to the workpiece holder, the workpiece can be held at a desired angle with respect to the table during a machining operation simply by raising the unhinged end of the top plate and supporting it at the desired angle with a gauge block.

In the manufacture of parts that only require one machining step to be performed, sufficient precision can be achieved by carefully following a prescribed set up procedure. In this procedure, the workpiece must be mounted to the vise, the vise secured to the top plate, and the bottom plate secured to the machine tool table. After hinged raising of the top plate, the roll must also be further tightened to the top plate in order to secure the assembly. When it is necessary to machine a large number of similar parts, the above described set up procedure must be accurately repeated for each of the parts. Although required in order to ensure precision, the repetitive performance of this same set up procedure constitutes a significant loss of operator time. This repetition can also cause operator fatigue or boredom, and result in error. Furthermore, the tightening of the top plate to the roll introduces some inaccuracy along the axis of connection.

Some parts require a particular machining operation to be performed upon opposite sides, or symmetrically with respect to a vertical axis that bisects the part. For these parts, the set up assembly, and in particular the bottom plate, must be disconnected and turned around on the machine tool table in order to position the workpiece at the required angle for completion of the second machining operation. In the mass production of parts of the this type, a great deal of time is lost in tearing down and connecting the set up assembly in a turned around position. Again, tediousness associated with accurately repositioning of the bottom plate for successive parts can increase the probability of operator error.

Another disadvantage of conventional set up assemblies relates to the manufacturing of parts that require multiple machining operations at multiple stations, or the measuring of the part on the fixture with a microscope or comparator in order to ensure accuracy. In moving a part to another station, it is required either that the fixture and part be removed from the set up assembly and mounted accurately at the remote station, or that the entire assembly, i.e., both plates, the fixture and the workpiece, be moved and accurately mounted at the remote station. In both cases, time is lost in the repetitive movement and remounting at subsequent work stations of partial or entire assemblies. Additionally, in order to promote assembly line production of the parts along the multiple stations, costs would increase because it would be necessary to use multiple set up assemblies, with one entire assembly per station. In short, the versatility of set up assemblies has not kept pace with the practicalities of mass manufacture of parts which require multiple machining operations, or one machining or measuring step at a remote work station.

Some versatility in machining operations can be achieved with a compound set up assembly, which utilizes several gauge blocks to hingedly raise a mounted workpiece about either one of, or both of, two perpendicular axes of connection. Robertson et al. U.S. Pat. No. 3,075,291 discloses a set up assembly that enables pivotal movement of a top plate with respect to the bottom plate along either of two perpendicular axes. While assemblies of this type do provide some increased versatility, they do not solve the aforementioned problems with respect to the mass production of parts requiring multiple machining operations, or machining upon opposite sides of a part. Moreover, compound set up assemblies of the type disclosed in Robertson typically fail to adequately hold a workpiece in a stable position during machining.

In another form of compound set up assembly, multiple pairs of set up plates are stacked to the desired height. If four pairs of set up plates are used, the uppermost plate may be raised about any one of up to four separate, vertically displaced axes. However, stacking of this type is costly, due to the number of plates typically required. Additionally, these stacked assemblies suffer from the same disadvantages mentioned previously, that of requiring an inordinate amount of set up time.

Thus, while present set up assemblies may provide a degree of accuracy in holding a workpiece at a desired position with respect to a machine tool table during a machining operation, their versatility is extremely limited, particularly in the mass production of articles that require multiple machining operations.

It is an object of this invention to provide a versatile set up assembly that accommodates accurate positioning of a workpiece with respect to a machine tool table when the workpiece requires multiple machining or measuring operations to be performed at multiple stations.

It is another object of this invention to provide a versatile set up assembly that achieves accurate and repeatable positioning of a workpiece with respect to a machine tool, but requires significantly less set up time.

It is yet another object of this invention to provide a set up assembly that facilitates the machining of opposite sides of a workpiece.

It is still another object of this invention to provide a set up or work station assembly that facilitates the mass production of parts.

SUMMARY OF THE INVENTION

This invention contemplates a set up assembly with an upper plate that is removable from a lower plate, the two plates being hingedly connectable along either one of two spaced parallel axes that lie in the same vertical plane.

To these ends, in accordance with a preferred embodiment of the invention, a set up, or sine plate assembly includes a lower plate; an upper plate; two spaced, parallel rolls rotatably mounted to the upper plate; and two pairs of inwardly directed connectors mounted to the lower plate, each pair of connectors axially aligned with, and adapted to selectively be locked into engagement with, the outer ends of one of the rolls in order to form a hinged connection between the plates. Thus, a hinged connection between the plates may be formed along either one of two spaced horizontal axes, and then easily disconnected, and the upper plate removed, if desired. The upper plate can be reconnected in the same manner, or turned around 180° and then reconnected. At both ends of the plates, the connectors and rolls have precisely machined surfaces that coact with each other in order to ensure repeatable accuracy in forming the hinged connection along the desired axis.

For the set up assembly of this invention, the distance between the rolls remains fixed, thus enabling the setting of a desired angle as in prior, conventional sine plate assemblies. However, by retracting the aligned pair of connectors along each of the axes, the plates can be disconnected and the upper plate removed. This feature is not provided by prior sine plate assemblies. With this invention, the upper plate can then be reconnected, or another plate having the same dimensions connected in its place along the same axis of connection, thereby to achieve, with relative simplicity, precisely the same spatial relationship between the machine tool mounted lower plate and whatever else is secured to the removably connectable upper plate.

This structure facilitates the mass production of parts because the lower plate may remain connected while successive fixtures and/or parts can be mounted to the upper plate at a removed, more convenient location. The structure also simplifies the procedure for machining parts that require multiple machining operations. At each machining site, a lower plate can remain fixed in position, while a group of similarly sized upper plates are successively connected, and after the machining operation, disconnected and then moved up the line to the site of the next operation. No disconnecting or reconnecting of the bottom plate is required, nor disconnecting or reconnecting of the fixtures to the upper plate. The only connection that must be made, the connection between the similarly sized upper and lower plates, is relatively simple and easy to perform. At the same time, while simplicity in connection is achieved, accuracy in set up is maintained.

Another aspect of this intention relates to the manufacture of parts which must be machined on opposite sides. Because the set up assembly of this invention enables either end of the upper sine plate to be hingedly raised, a significant reduction in set up time is realized because the lower plate does not have to be turned around and accurately positioned in order to machine a second side of a part at the same angle as the first side. This feature will be more clearly understood with reference to FIGS. 4 and 5.

It is to be understood that the invention contemplates forming the hinged connections by mounting the rotatable rolls to one of either the lower or the upper plates, with the retractable connectors mounted to the other of the two plates.

It is also to be understood that the invention contemplates a removable, hinged connection between any two upper and lower set up members at a work station. For instance, the machine tool table or stage could serve as the lower member, with the hingedly connectable upper member being either a plate or a fixture.

These features and others will be more readily understood in view of the following detailed description and the drawings in which:

BRIEF DESCRIPTION OF THE DRAWINGS

FIG. 4 shows the upper plate hingedly connected to the lower plate and raised about a first axis of connection, and FIG. 5 shows the upper plate hingedly connected to the lower plate and raised about a second axis of connection that is parallel to, and spaced from, the first axis;

DETAILED DESCRIPTION OF THE DRAWINGS

Figure 1:
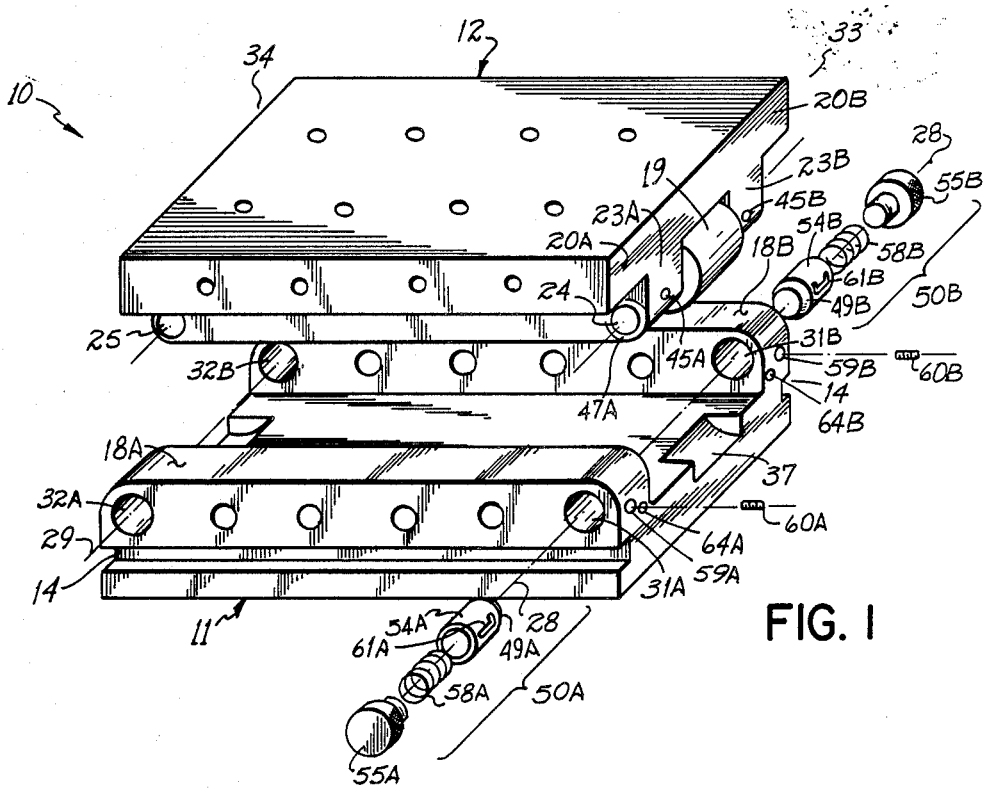
FIG. 1 illustrates, in a partial disassembled perspective, the upper and lower plates for a sine set up assembly in accordance with a preferred embodiment of the invention.

In accordance with a preferred embodiment of this invention, a set up, or sine plate assembly 10 includes a lower plate 11 and an upper plate 12, as shown in FIG. 1. The lower plate 11 may be secured to a machine tool table (not shown), while a fixture (not shown) may be secured to the upper plate 12, the fixture designed to hold a workpiece.

In the lower plate 11, outwardly opening channels 14 extend along opposite faces to facilitate securing of the lower plate 11 to the machine tool table. The lower plate 11 has spaced, upwardly directed parallel flanges 18A and 18B located on opposite sides thereof. The upper plate 12 is supported above the lower plate 11 by a roll 19. When supported, the upper plate has shoulders 20A and 20B that are situated above flanges 18A and 18B, respectively, with a vertical clearance of about 0.008". The roll 19 is mounted to a midportion 23 of upper plate 12 that extends downwardly toward the lower plate 11 between the flanges 18A and 18B.

The midportion 23 has a pair of bores 24 and 25 that extend completely therethrough in a direction that is perpendicular to the flanges when the upper plate 12 is supported on the lower plate 11. In this position, the bores 24 and 25 are axially aligned with parallel, spaced axes of connection 28 and 29, respectively. The flanges 18A and 18B have pairs of holes that are axially aligned with these axes of connection. In FIG. 1, hole 31A in flange 18A and hole 31B in flange 18B are aligned with the first axis of connection 28. Similarly, hole 32A in flange 18A and hole 32B in flange 18B are aligned along the second axis of connection 29.

This invention enables the forming of a simple, yet precise, removable hingable connection between upper plate 12 and lower plate 11 along either of the two spaces axes of connection, axis 28 or axis 29. Thus, either a first end 33 or a second end 34 of the upper plate 12 may be raised about the axis at the opposite end. The upper plate 12 may also be disconnected from lower plate 11, and then reconnected, with the machined means for connecting the plates providing accuracy in reconnection to within 0.0001 of an inch.

Figure 2:
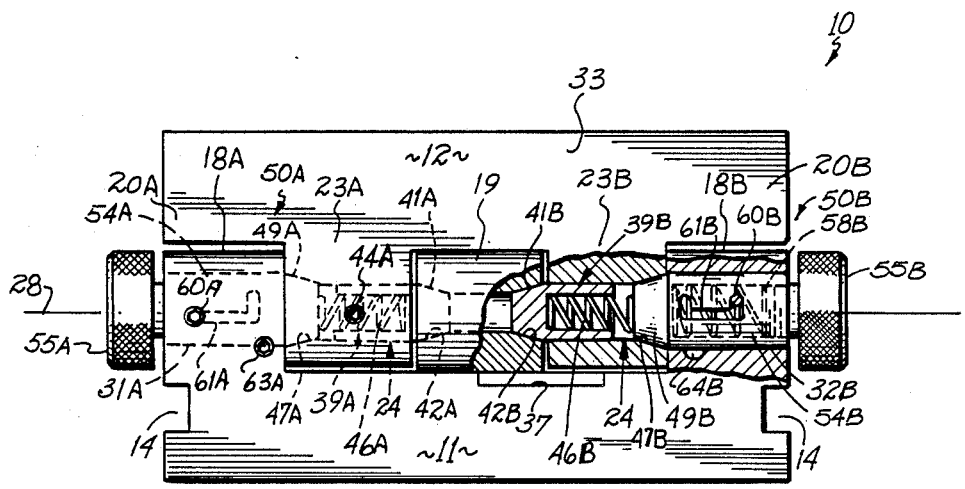
FIG. 2 is a partial cross-sectional view illustrating a hinged connection between upper and lower plates in accordance with a preferred embodiment of the invention.
Figure 3A:
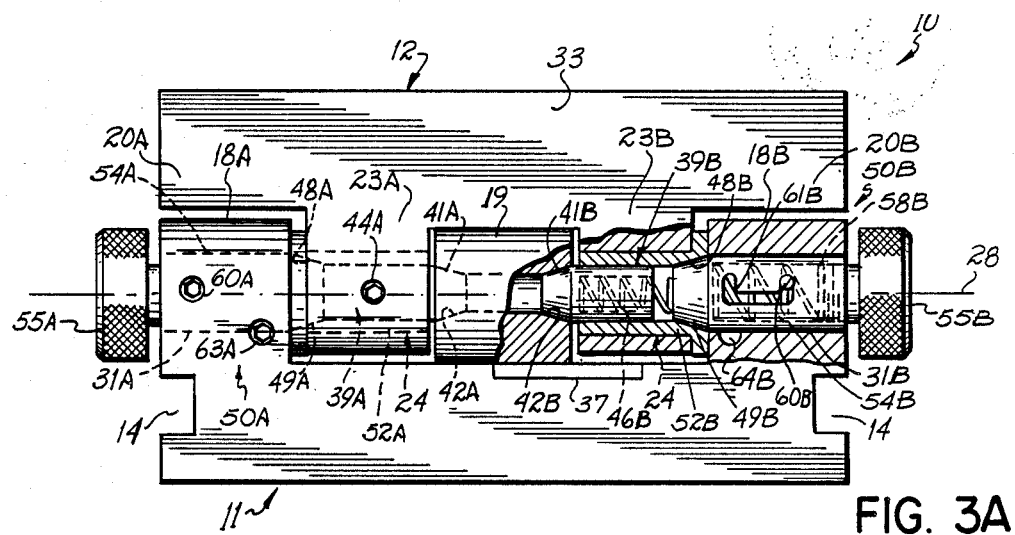
FIG. 3A is a partial cross-sectional view similar to FIG. 2, showing an alternate embodiment of the invention.
Figure 3B:
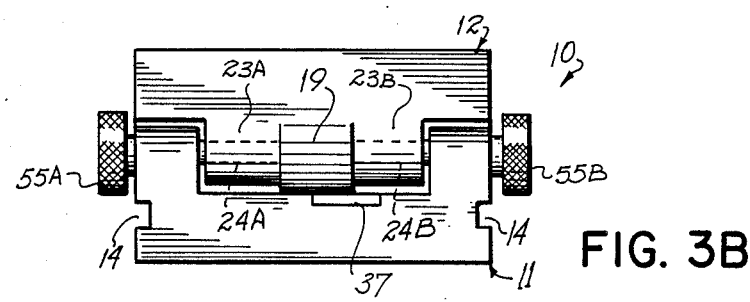
FIG. 3B is a partial cross-sectional view similar to FIG. 2, showing/another embodiment of the invention.

Because the hingable connections along both axes of connection are the same, only one such connection will be described, with reference to axis 28 in FIGS. 2, 3A and 3B. FIG. 2 shows that, adjacent first end 33, midportion 23 actually has two similarly shaped outer portions, designated 23A and 23B, with the roll 19 mounted therebetween. Beneath a part of the roll 19, and offset slightly to one side, the bottom plate has a minute angle gauge block cut out 37 sized to receive a gauge block of selectable thickness. Starting at 0.100 of an inch for non-metric set up assemblies, the cut out 37 has a depth of 0.100 of an inch.

The roll 19 actually is one part of a roll assembly extending through bore 24 of upper plate 12, along axis 28. The roll assembly also includes a pair of inwardly directed center pins 39A and 39B, that are fixedly secured within bore 25. The center pins 39A and 39B hold the roll 19 in place, preferably so that it is rotatable about axis 28. To hold the roll 19 in place, each of these pins has inwardly directed faces 41A and 41B that coact with outwardly directed surfaces 42A and 42B, respectively, of the roll 19. The coacting surfaces are machined at precise, complementary angles in order to positively hold the roll 19 centered on axis 28, when the center pins 39A and 39B are secured in position. Preferably, as shown in FIG. 2, the angles of faces 41A and 41B are about 15° from horizontal. The center pins 39A and 39B are fixedly secured within bore 24 by Allen head locking screws 44A and 44B (shown in FIGS. 2 and 3) that extend through locking screw apertures 45A and 45B, respectively, in the upper plate 12 (shown in FIG. 1). High accuracy in connection is achieved because the roll 19 is held in "dead center" position with respect to the axis of connection 28.

Preferably, the center pins 39A and 39B are hollowed to receive compression springs 46A and 46B, respectively. These springs help to ensure axial alignment of the connections along axis 28. When engaged, the springs exert an outward force of about 5 pounds. As shown in FIG. 2, outwardly directed surfaces 47A and 47B of the midportions 23A and 23B, respectively, are angled to axially receive correspondingly angled, inwardly directed surfaces 49A and 49B of connectors 50A and 50B. The connectors 50A and 50B are actually formed by a number of smaller parts that comprise a retractable center assembly that holds the roll assembly 19 dead center on axis 28 when connected. In another embodiment, as shown in FIG. 3A, a pair of thrust plate center bushings 52A and 52B may be positioned within bore 24. The outwardly directed surfaces 48A and 48B of the bushings 52A and 52B are angled to coact with the inwardly directed angled surfaces 49A and 49B of the connectors 50A and 50B. Again, these angles are also preferably about 15° from horizontal. In yet another embodiment, shown in FIG. 3B, the roll 19 is integrally formed on upper plate 12. In this embodiment, there are two distinguishable bores along axis 28, designated 24A and 24B.

In the first preferred embodiment, shown in FIG. 2, the bores 24 and 25 are drilled to a diameter of $\frac{3}{8}$," and the center pins sized accordingly. In the second preferred embodiment, shown in FIG. 3A, the bores are drilled to a diameter of $\frac{1}{2}$". The diameters of the center pins 39A and 39B remain the same, with the extra space being occupied by the added diameter of the bushings. The bores may be formed with an E.D.M. wire cutter.

Selective engagement between the inner ends 49A and 49B of the connectors 50A and 50B, and the outer ends of the roll assembly, completes the hingable connection along axis 28. For the three described embodiments, the term "outer ends" of the roll assembly contemplates the springs 46A and 46B along with outwardly directed angled surfaces of either the midportions 23A and 23B or the bushings 52A and 52B. Alternately, longer center pins or other bore residing parts with angled outer ends could also be used. A similar connection is made along axis 29. Because connectors 50A and 50B are substantially the same, only connector 50B will be described.

The connector 50B includes a hollowed, hinge center 54B that is situated within the hole 31B. The hinge center 54B has internal threads into which a knurled knob 55B is threadably received. A compression spring 58B resides within the hinge center 54B, one side of the spring 58B bearing against the inside surface of inner end 49B of the hinge center 54B and the other side of the spring 58B bearing against an Allen head pin 60B that extends radially into hole 31B. Preferably, the pin 60B is threadably received within an internally threaded aperture 59B in lower plate 11 (shown in FIG. 1). The pin 60B also extends radially through a U-shaped channel 61B formed in hinge center 54B. The distance between the knurled knob 55B and the inner end 49B of the hinge center 54B remains fixed, the force of the spring 58B biasing the retractable center assembly 50B inward into cooperative engagement with the outwardly directed face of the roll assembly. By rotating the knurled knob 55B with respect to the lower plate 11, the connector 50B can be retained on the pin 60B in either an inward or an outward position.

Except for the shape of the channel 61A and the force constant of the spring 58A, the connector 50A is similar to connector 50B. To provide stability, it is desirable that one spring be stronger than the other, so that there is no horizontal "play" along axis 28 when the connectors 50A and 50B engage the outwardly directed ends of the roll assembly. Preferably, spring 58B exerts about a 20 pound force during engagement while spring 58A exerts about a 15 pound force. The radially directed leg of channel 61A enables connector 50A to be retained in an outward position.

In grinding operations, the springs 58A and 58B provide enough force to bias the connectors 50A and 50B into firm engagement with the outwardly directed ends of the roll assembly. The extra leg of U-shaped channel 61B retains connector 50B in an inward position, preventing horizontal movement of the connectors 50A and 50B during grinding. For milling or drilling operations, sufficiently greater forces are transmitted to the workpiece, and hence, to the entire assembly 10. Therefore, the connectors must be firmly secured in engagement with the ends of the roll assembly in order to maintain a stable hinged connection along axis 28. To this end, Allen head locking screws 63A and 63B that are threadably received within locking screw apertures 64A and 64B, respectively, in lower plate 11 (shown in FIG. 1) can be tightened to apply radially directed force to the hinge centers 54A and 54B in order to firmly secure the connectors 50A and 50B in an inward position. It is to be noted that any use of locking screws in this nature introduces some inaccuracy to the assembly. However, with this invention, this inaccuracy is avoided with respect to grinding or other non-heavy duty machining operations.

Figure 7:
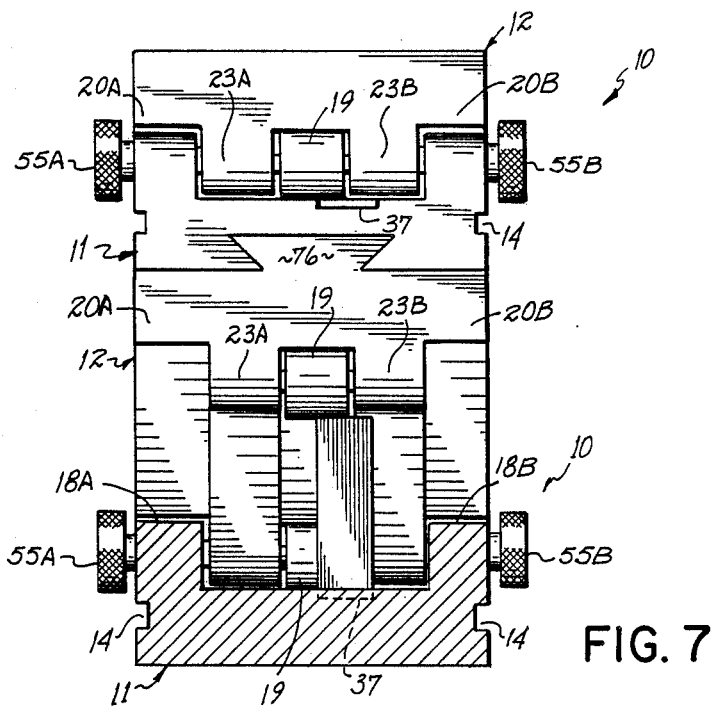
FIG. 7 shows a partial cross-sectional view taken along lines 7-7 of FIG. 6.

Although a particular locking mechanism has been described (a modified version of the latch structure shown in FIG. 7 of Eckert U.S. Pat. No. 2,449,459, expressly incorporated by reference herein in its entirety), any number of other engagement mechanisms may be employed to engage the connectors to the outwardly directed surfaces of the rolls. However, the engagement mechanism utilized must provide the same high degree of precision in forming the hinged connection along the axis of connection.

With the retractable connectors 50A and 50B, either end 33 or 34 of the upper plate 12 may be hingedly raised. In order to provide an upper plate that is hingedly raisable about any one of four different axes, only two sets of plates are required to be stacked, as opposed to the four sets formerly required. The sine plate assembly of this invention enables the upper plate to be removed, thus allowing measurement on a comparator or the performance of a second operation on another machine. The plate can then be returned to the first machine and remounted within 0.0001 inch. When using a vice or other fixture on the upper plate 12 for machining or measuring steep angles, it is also possible to remove the plate, turn it around 180, and then remount it.

Figure 4:
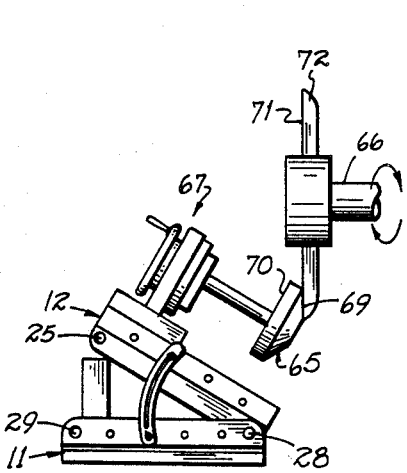
FIGS. 4 and 5 illustrate the use of a set up assembly of this invention in a machining operation that requires a part to be machined on opposite sides.
Figure 5:
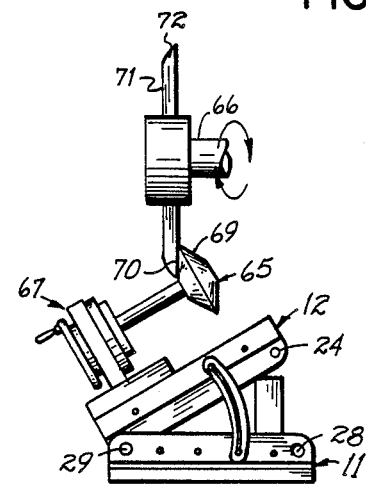

The invention is also useful in machining opposite sides of a part. For instance, as shown in FIGS. 4 and 5, when making a special purpose cutter 65 using a surface grinder 66, and a spin index fixture 67 (for example a Harig Grind All No. 1), this invention will allow both sides 69 and 70 of the cutter 65 to be ground by surface 71 without requiring that the entire assembly be turned around on the table. Only the dish wheel 72 must be turned around on the grinder 66, and the other end of the upper plate 12 raised. As shown in FIG. 4, the upper plate 12 is raised about axis 28 to grind side 69 of cutter 65 with flat surface 71, which faces to the left. In FIG. 5, upper plate 12 is raised about axis 29 in order to grind side 70 with flat surface 71, which now faces to the right.

The removable upper plate 12 constitutes a removable work station, stage, or set-up plate to be used on a conveyor assembly line, a comparator, microscope, tape controlled milling machine, machining center, standard milling machine, grinder, or in any other application that requires precision machining or workpiece holding capability. Multiple upper plates can be removed from and reconnected to mounted base plates, with the connections being within 0.0001 inch. Several people can work loading and unloading these removable upper plates while the machine tool is performing its work.

If different fixture accessories are mounted on different, removable upper plates, they can be used and reused at various stations without indicating them a second time. Some examples of these accessories are a vertical vee block, a horizontal vee block, an angle plate, a vertical vise, and horizontal vise. Moreover, all of the above noted accessories, and further including spin fixtures, could be formed integrally with the top plate and/or be made interchangeable from base to base (lower plate to lower plate) in standard sizes ($2''\times 3''$, $4''\times 6''$, $6''\times 8''$, $8''\times 10''$, etc.) to connect to correspondingly sized lower plates, or correspondingly sized machine tool tables, for that matter.

Figure 6:
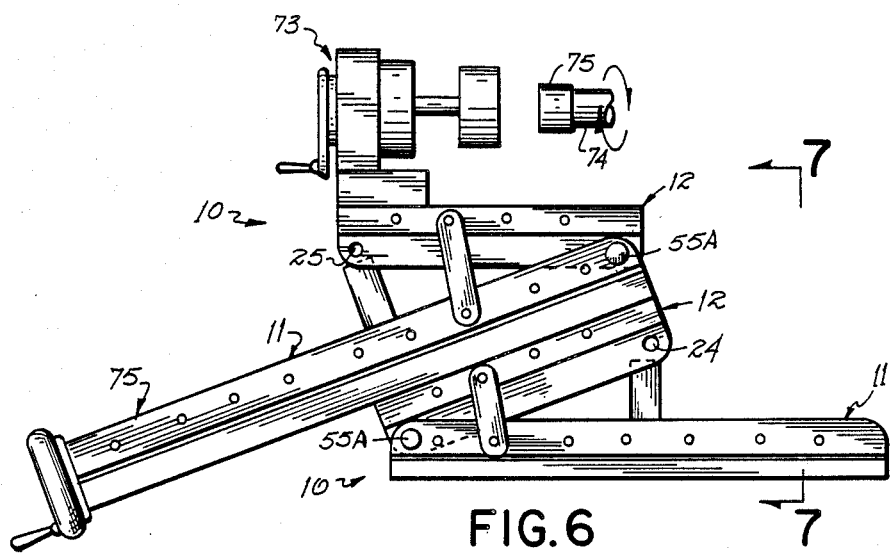
FIG. 6 shows another embodiment of the invention.

FIGS. 6 and 7 illustrate another use of the sine plate assembly 10 of this invention. By adding a slide connection 76 (shown in FIG. 7) and a second assembly 10, so that the compound assembly is mounted under a spin fixture 73, precision internal angles and diameters can be ground using a surface grinder 74 and a high speed spindle 75. Typically, these angles must be ground on a jig grinder, and the assembly and components of the set up will be significantly higher in cost than those depicted in FIG. 6. When combining two or more of the assemblies 10 with slide connections therebetween, the possible variations in set up multiply, while the number of actual plates required to be stacked remains minimal compared to prior, fixedly hinged sine plate assemblies.

Figure 8:
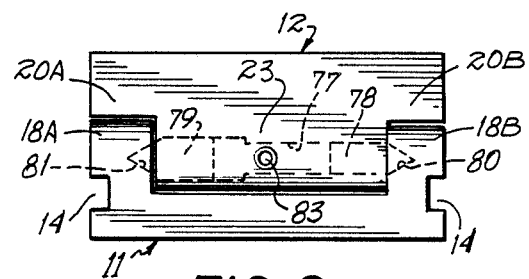
FIG. 8 shows another embodiment of the invention.

In addition to manual operation of the connectors in order to connect or disconnect the plates, the connectors could also be operated by any number of different mechanisms, including pneumatics, hydraulics, or electric solenoids, thereby automating the set up procedure. For example, the set up assembly of this invention may be used advantageously as a replaceable, hingedly connected pallet for tape controlled machines. Many of these machines provide a hydraulic sequence cycle. To take advantage of this feature, as shown in FIG. 8, hydraulic operation of the retractable center assembly could be achieved by providing a bore 77 through midportion 23. The bore 77 acts as a hydraulic cylinder with hydraulically movable pistons, or centers, 78 and 79 that axially connect within bores 80 and 81, respectively, in the lower plate 11. Hydraulic fluid is introduced and withdrawn into cylinder 77 through hole 83 during the course of a cycle. In order to provide increased horizontal stability along the axis connection, it is desirable to use pistons of different diameter, and the bore 77 should be machined to accommodate these two different diameters. In FIG. 8, piston 79 has a greater diameter than piston 78, and the proportionally greater thrust force against piston 79 holds the upper plate 12 against flange 18B of lower plate 11.

The convertible sine plate can be made in different sizes with different materials to suit the need. When used on comparators, microscopes, electrical discharge machines, or in chemical milling or drilling operations, where strength of material is not the major consideration, the plates should be made of plastic or ceramic material. Such materials will prove to be sufficiently accurate. For a microscope or comparator using substage illumination, a clear plastic base would be necessary. Where strength is a major consideration, the plates must be made from hardened stainless steel, tool steel, or some other material. The connector and rolls are to be made from hardened high speed steel or other suitable material.

While these and other features of a set up assembly in accordance with two preferred embodiments of the invention have been described, it is to be understood that the invention is not limited thereby and that in light of the present disclosure, various other alternative embodiments will be apparent to one of ordinary skill in the art without departing from the scope of the invention. Accordingly, applicant intends to be bound only by the following claims.

We claim:

1. A set up assembly for use in holding a workpiece during a machining operation comprising:
   a first member;
   a second member disposed above and supported by said first member;
   a roll assembly mounted to one of said members along an axis, the roll assembly having outwardly directed ends; and
   engagement means mounted to the other of said members, said engagement means being selectively movable into engagement with said outwardly directed ends of said roll assembly to form a hingable connection between said first and second members, said engagement means coacting with said outwardly directed ends to form said connection in dead center position along said axis, whereby said second member may be hingedly raised above said first member about said axis, said engagement means further being selectively movable out of engagement with said roll assembly to permit removal of said second member from said first member.

2. The set up assembly of claim 1 wherein said first and second members are lower and upper sine plates, respectively.

3. The set up assembly of claim 1 wherein said engagement means is axially movable into engagement with said roll assembly.

4. The set up assembly of claim 1 wherein said roll assembly is rotatable about said axis.

5. The set up assembly of claim 1 wherein said engagement means is rotatable about said axis.

6. The set up assembly of claim 2 wherein said roll assembly is mounted to said upper plate and said engagement means is mounted to said lower plate.

7. The set assembly of claim 1 wherein said engagement means further comprises:
   a pair of inwardly directed connectors, said connectors being axially aligned with and axially movable into connection with said roll assembly.

8. The set up assembly of claim 7 wherein said outwardly directed ends of said roll assembly are angled to coact with said inwardly directed connectors when in engagement therewith to form said connection, thereby to ensure precision in forming said hingable connection along said axis.

9. The set up assembly of claim 8 and further comprising:
   means for inwardly biasing each of said connectors toward said outwardly directed ends, said connectors being outwardly retractable to permit placement of said roll assembly along said axis of connection, one of said connectors being biased inwardly with a greater force than the other of said connectors.

10. The set up assembly of claim 9 and further comprising:
    means for locking said inwardly biased connectors into firmly secured engagement with said outwardly directed ends.

11. The set up assembly of claim 8 wherein said roll assembly further comprises:
    an axially directed spring located at each of said outwardly directed ends for axially aligning said respective coacting connector.

12. The set up assembly of claim 1 wherein said roll assembly is integrally formed with said one of said members.

13. A set up assembly as in claim 1 and further comprising:
    a third member disposed above and supported on said second member, thereby to form a compound set up assembly.

14. The set up assembly of claim 13 wherein said second member and said third member are slidably engaged.

15. A set up assembly for use in holding a workpiece during a machining operation comprising:
    a lower plate;
    an upper plate disposed above said lower plate;
    coupling means for selective hingable coupling of said upper and lower plates along a first axis of connection; and
    second coupling means for selective hingable coupling of said upper and lower plates along a second axis of connection parallel to and spaced from said first axis, thereby enabling said upper plate to be selectively connected and hingedly raised about one of said first and second axes.

16. The set up assembly of claim 15 wherein said first and second axes lie in a common horizontal plane.

17. The set up assembly of claim 15 wherein each said coupling means further comprises:
    a roll assembly mounted to one of said upper and lower plates, said roll assembly having outwardly directed ends; and
    engagement means mounted to the other of said upper and lower plates, said engagement means adapted to selectively engage said outwardly directed ends to form said respective hingable connection.

18. The set up assembly of claim 17 wherein said roll assemblies are mounted to said upper plate and said engagement means are mounted to said lower plate.

19. The set up assembly of claim 17 wherein each said engagement means further comprises:
    a pair of inwardly directed connectors axially aligned with said respective roll assembly.

20. The set up assembly of claim 17 wherein said outwardly directed ends of each said roll assembly are angled to coact with said connectors when in engagement therewith.

21. The set up assembly of claim 19 and further comprising:
means for biasing said pair of connectors to an inward position, said connectors being outwardly retractable to permit placement of said respective roll assembly along said axis of connection therebetween, and one of said connectors being inwardly biased at a greater force than the other of said connectors.

22. The set up assembly of claim 21 and further comprising:
means for locking each of said connectors in said inward position, thereby to firmly secure said engagement between said coacting surfaces.

23. The set up assembly of claim 19 wherein each said roll assembly further comprises:
a spring located at each of said outwardly directed ends to axially align said respective coacting connector when in engagement therewith.

24. A set up assembly comprising:
a lower plate;
an upper plate disposed above said lower plate;
a pair of roll assemblies, said roll assemblies mounted to said upper plate in spaced, parallel relationship, each said roll assembly having outwardly directed ends;
two pairs of connectors mounted to said lower plate, each said pair of connectors aligned with one of said roll assemblies along an axis of connection, each said pair of connectors adapted to be axially moved into engagement with said outwardly directed ends of said aligned roll assembly to form a hingable connection along said axis, thereby to provide selective hingable connection of said plates about either of two parallel axes of connection.

25. The set up assembly of claim 24 wherein each said roll assembly further comprises:
a roll rotatably mounted to said upper plate, said roll having outwardly directed surfaces; and
a pair of center pins fixedly connected to said upper plate along said axis on opposite sides of said roll, each said center pin having an inwardly directed face coacting with a respective outwardly directed surface of said roll to retain said roll in dead center position along said axis, each said center pin further having an outwardly directed face selectively engageable by said respective connector.

26. A set up assembly for use in holding a workpiece during a machining operation comprising:
a lower member;
an upper member disposed above said lower member; and
automatic coupling means for automatic hingable coupling of said first and second members along an axis of connection, said automatic coupling means including axially movable center pins that hold said members in dead center position along said axis when said members are coupled.

27. The set up assembly of claim 26 wherein said automatic coupling means is operated hydraulically.

28. A set up assembly comprising:
an upper member for holding a workpiece at a work station;
retractable coupling means formed on said member for selective, hingable attachment of said member to said work station in dead center position along an axis of connection, said retractable coupling means being retractable along said axis to selectively detach said member from said work station.

* * * * *